Dec. 29, 1942.    S. RUBEN    2,306,408

MAGNESIUM PRIMARY CELL

Filed Nov. 15, 1941

INVENTOR.
Samuel Ruben
BY
ATTORNEY

Patented Dec. 29, 1942

2,306,408

UNITED STATES PATENT OFFICE 2,306,408

MAGNESIUM PRIMARY CELL

Samuel Ruben, New Rochelle, N. Y.

Application November 15, 1941, Serial No. 419,249

6 Claims. (Cl. 136—100)

This invention relates to primary cells employing an electrode of magnesium.

An object of the invention is to provide a primary cell of high output, and which may be economically manufactured.

Another object is the provision of a primary cell which will maintain its potential over a substantial part of its operating life.

A further object is the provision of a primary cell capable of supplying current over sustained periods without excessive polarizing effects.

A further object is the provision of a cell having a high power output for a given weight and volume.

Another object is the provision of such a cell having a low shelf life loss.

A further object is the provision of a primary cell of novel construction.

Figure 1:
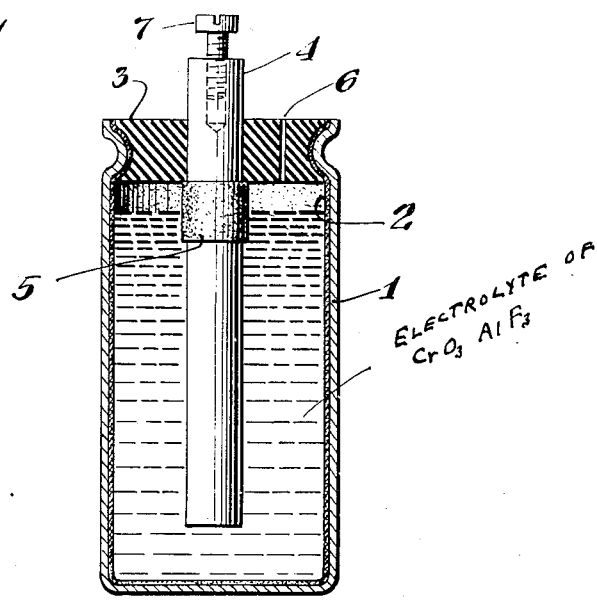
Figure 2:
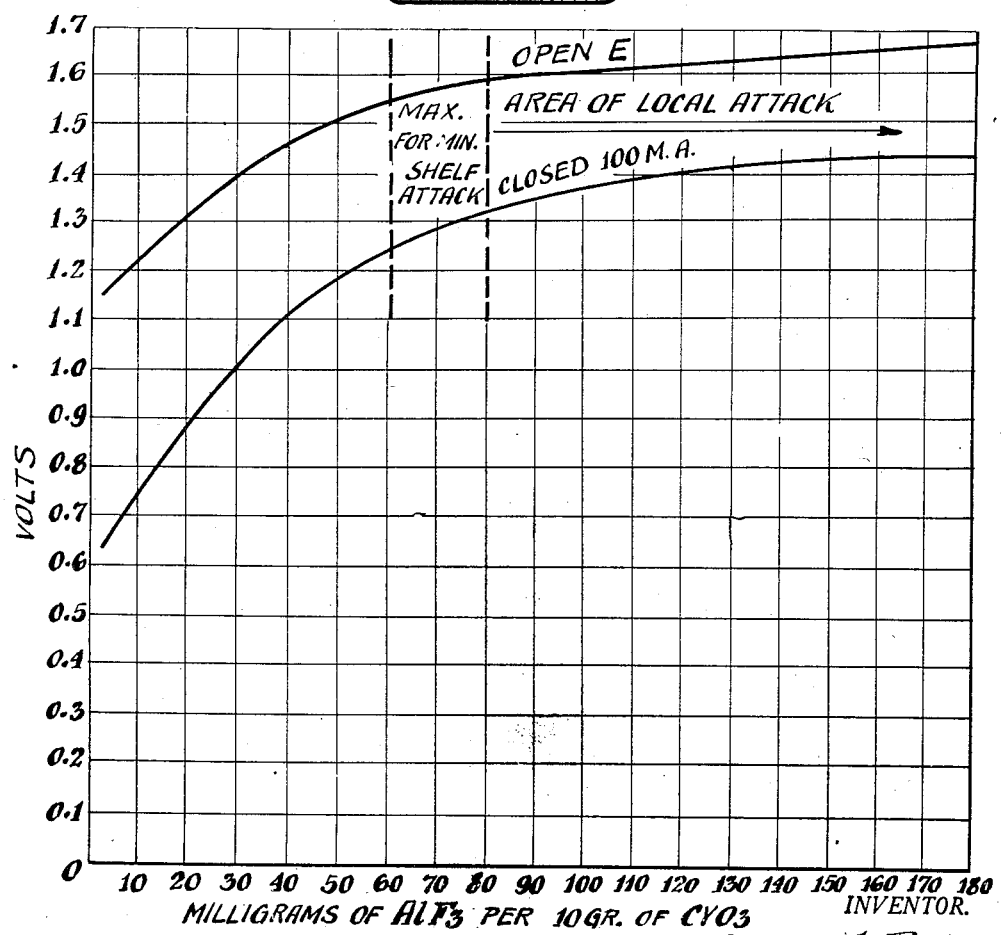

Other objects will be apparent from the disclosure and from the drawing in which Fig. 1 is a view partly in section of a primary cell embodying features of the invention, and Fig. 2 is a graph showing operating characteristics of a cell of the invention.

In my Letters Patent Numbers 2,257,129 and 2,257,130 I describe a primary cell utilizing magnesium as the negative electrode and having an electrolyte formed from a solution of chromic acid and a fluoride of a basic ion, such as a fluoride derived from an alkali earth or alkaline metal of the first and second periodic groups of elements.

Magnesium, if used as the negative electrode in a cell having a chromic acid electrolyte and a cooperating electrode of carbon, becomes passive. No output is obtainable from the cell due to a polarizing film produced on the surface of the magnesium. The addition of a fluoride of a basic metal or ion as described in my patents and application referred to activates the electrolyte solution and results in a cell capable of providing voltage and current in excess of that of cells of the prior art. By control of the fluoride content to a value sufficient only to activate the cell, shelf life attack, an inherent limitation on the use of magnesium, can be reduced to a negligible value.

The present application relates to and the invention comprises a primary cell employing a negative electrode of magnesium and an electrolyte formed from a solution of chromic acid and a fluoride compounded from a metal element having amphoteric characteristics, as distinguished from the fluorides described in my prior patents derived from an alkali earth or an alkaline element.

I have found that fluorides derived from certain amphoteric elements, for example aluminum, also possess characteristics permitting their use in magnesium primary cells utilizing chromic acid electrolytes. However, the amphoteric metal fluoride must also be soluble in chromic acid.

While this group of fluorides will not render the chromic acid as active as do the fluorides of my patents and application above referred to and do not provide as high an open or load circuit voltage, they are entirely satisfactory for a large number of applications. The magnesium primary cell having an electrolyte of chromic acid and aluminum fluoride will have a closed circuit potential of approximately 1.3 volts as compared with a magnesium primary cell of similar structure employing an electrolyte of chromic acid and a fluoride derived from a basic element, which has a potential in the order of 1.9 volts.

Aluminum is the most practicable and is the preferred element from which the fluoride of this invention is formed. However, the fluoride may also be compounded from other amphoteric elements such as tin, zirconium, thorium and thallium.

The percentage of fluoride added to the chromic acid will vary with the solubility of the fluoride and its effect upon shelf life. In the case of aluminum fluoride I have found that it requires about six hundred milligrams per one hundred grams of chromic acid to give the maximum life consistent with a reasonably good output. Beyond one thousand milligrams per one hundred grams of chromic acid excessive attack on the magnesium occurs. The preferred range is one hundred to one thousand milligrams of aluminum fluoride per one hundred grams of chromic acid.

The operating characteristics of a magnesium primary cell having a cooperating carbon electrode with various proportions of aluminum fluoride in chromic acid is shown in Fig. 2 of the drawing.

Fig. 1 illustrates the structure of a primary cell of this invention. The inside surface of steel container 1, is sprayed with a layer of carbon 2, which is heat bonded to the steel by the addition of a chromic acid resistant binder such as "Koroseal" (vinyl chloride). The amount of binder used is about ten percent by weight of the carbon. A thinner is employed and the mixture after it has been sprayed to the wall of the container is baked at a temperature of about 125° C. The use of this carbon coated steel surface is of considerable advantage inasmuch as the steel itself is not attacked by the chromic acid and becomes passive.

Magnesium rod electrode 4, is forced through top sealing plug 3, composed of solid "Koroseal." The magnesium rod has a partial coating of "Koroseal" 5 so that the electrolyte is above the exposed end of the magnesium, thus preventing corrosion at the air line due to the formation of magnesium oxide in contact with the air. This protection of the magnesium reduces shelf life loss considerably. The vent 6, is employed to allow escape of any uncombined gases. This vent may be in the form of a porous "Koroseal" plug which under normal conditions will not allow liquid to pass out of the cell but will allow escape of any accumulated gases.

Screw 7 provides a convenient terminal for the magnesium electrode.

The electrolyte in the cell is formed from ten grams of chromic acid, sixty milligrams of aluminum fluoride and thirty cc. of distilled water. The chromic acid, aluminum fluoride and water are mixed together to form the electrolyte solution which is then filtered through a ceramic type filter. I have found in order to minimize local corrosion, that freedom from insoluble or floating particles is highly desirable if not necessary in the electrolytes of these magnesium primary cells. For this reason, careful filtering is beneficial.

While the structure of the cell described has been found to be of advantage, other structures may be utilized, for instance those shown and described in my prior patents above referred to. If desirable the electrolyte may also be immobilized, such as by the addition of inert oxides, silica gel, etcetera.

What is claimed is:

1. A primary cell comprising a negative electrode of magnesium, a cooperating positive electrode and an electrolyte comprising a solution of chromic acid and a fluoride of an amphoteric element.

2. A primary cell comprising a negative electrode of magnesium, a positive electrode and an electrolyte comprising chromic acid and a fluoride selected from the group of fluorides consisting of aluminum, tin, zirconium, thorium and thallium.

3. A primary cell as described in claim 2 characterized in that the positive electrode is a carbon material.

4. A primary cell comprising a negative electrode of magnesium, a positive electrode and an electrolyte comprising chromic acid and aluminum fluoride.

5. A primary cell comprising a negative electrode of magnesium, a positive electrode and an electrolyte comprising chromic acid and a fluoride formed from an amphoteric element, said fluoride being soluble in the chromic acid.

6. A primary cell comprising a negative electrode of magnesium, a positive electrode and an electrolyte comprising chromic acid and a fluoride of an amphoteric element, the percentage of fluoride being from one hundred to one thousand milligrams per one hundred grams of chromic acid.

SAMUEL RUBEN.